2,735,752

HYDRAZINE RECOVERY PROCESS

Floyd T. Neth, Baton Rouge, La., assignor to The Ohio State University Research Foundation, Columbus, Ohio, a corporation of Ohio No Drawing. Application August 4, 1953,
Serial No. 372,383

10 Claims. (Cl. 23—190)

This invention relates to the production of hydrazine and, more specifically, to the method of producing substantially pure hydrazine from the halide salts of hydrazine and from hydrazine contaminated by ammonium or substituted ammonium salts.

In recent years, there has developed considerable interest in hydrazine both as a raw material for chemical syntheses and as a high energy fuel. Compounds synthesized from hydrazine have found use as germicides, drugs, insecticides, herbicides, photographic developers, water softeners, dyes, explosives, and textile treating agents. Its use as a high energy fuel for rockets and the increasing interest in rocket development have resulted in accelerated efforts to develop cheaper and more efficient methods of preparing hydrazine. The presently used commercial processes involve the oxidation of ammonia or urea by sodium hypochlorite in the presence of caustic soda. These methods produce hydrazine hydrate from which anhydrous hydrazine is recovered by rather complicated methods.

In recent years, a new process has been reported whereby anhydrous ammonia is oxidized by anhydrous chlorine to produce hydrazine dissolved in liquid ammonia. Unfortunately, this method produces ammonium chloride also, which is dissolved in the final reaction mixture. To obtain anhydrous hydrazine is then a matter of finding an efficient means for separating it from this mixture. Although free hydrazine is present in the liquid ammonia solution along with ammonium chloride, it is relatively difficult to separate therefrom because the low boiling point of the ammonia causes simple distillation to result in removal of the ammonia first and formation of a residue of ammonium chloride and hydrazine hydrochloride.

One method of separating hydrazine from hydrazine hydrochloride is to treat it with sodium methylate in methanol. Most of the chloride is converted to sodium chloride which precipitates and is removed by filtration, leaving a solution of hydrazine in methanol. Distillation has been reported to leave a residue of substantially pure anhydrous hydrazine. However, my experience has shown that separation of hydrazine from methanol is not satisfactory because the hydrazine product is contaminated with methanol and the yield is unsatisfactory, a result of uncontrollable decomposition of hydrazine during the process. The reaction by which the sodium methylate liberated hydrazine is the ordinary displacement mechanism in which a weaker base is displaced by a stronger base. The disadvantage of adding another volatile material (methanol) to a hydrazine-ammonia-sodium chloride mixture is obvious since it further complicates the separation step here.

In accordance with the present invention, a new method is now provided whereby pure anhydrous hydrazine can be obtained from the halogen salts thereof or from mixtures of hydrazine and the halogen salts of ammonia dissolved in liquid ammonia. In the method of preparing hydrazine by the oxidation of ammonia with chlorine, the final mixture from which hydrazine must be separated will consist essentially of hydrazine and ammonium chloride dissolved in liquid ammonia.

The present invention involves the addition to such mixtures of a stoichiometric quantity, based on the total amount of chloride, of an alkali metal or alkaline earth metal dissolved in ammonia whereby the chloride becomes associated with the alkali metal and the ammonium ions are converted to ammonia. If salt precipitates, it may, if desired, be removed by filtration, decantation or the like. Hydrazine can be easily recovered from this mixture by distillation.

The mechanism by which the method of the present invention is operative is an oxidation-reduction reaction in which an electron from the added alkali or alkaline earth metal reduces the ammonium ions associated with a halogen ion and produces ammonia and the salt of the added metal, as illustrated by the following equation:

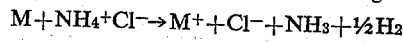

Alkali metal halide either solid or in solution is inert towards hydrazine and the latter is readily separated therefrom.

It is well known that anhydrous liquid ammonia will dissolve the alkali and alkaline earth metals. Dilute solutions are blue in color whereas concentrated solutions have a lustrous bronze color. The concentrated (bronze) solutions show metallic conductance characteristics whereas the more dilute (blue) solutions behave as electrolytic conductors containing negative ion of very high mobility. It has been found that the molar conductivity of such solutions decreases with decreasing concentration to a minimum value when the color changes from bronze to blue and thereafter, increases to a limiting value as the solution is further diluted. The magnetic data for such dilute solutions indicate that the following equilibrium exists:

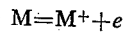

The exact mechanism of solvation is not known and does not constitute a part of the present invention. For our purposes, the metal in the dilute ammonia solution is considered to be in the form of the positive ion and the liberated electron is believed to be associated in some manner with the solvent. Thus, the reaction can arbitrarily be written as follows:

Thus, upon adding a solution of sodium in ammonia to an ammonia solution of hydrazine, ammonia and ammonium ions, the ammonium ions are reduced to ammonia and hydrogen by the "free" electrons and sodium chloride forms according to the following equation:

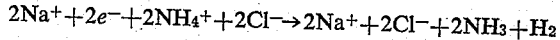

Furthermore, the relatively low solubility of sodium chloride in liquid ammonia results in the precipitation of most of the sodium and chloride ions as solid sodium chloride:

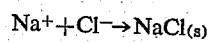

The solid sodium chloride can be separated to give a solution of hydrazine in liquid ammonia, from which the hydrazine can readily be recovered by fractionation.

The present invention is further illustrated by the following illustrative but non-limiting example.

*Example*

One-half mol (52.5 grams) of hydrazine dihydrochloride was dissolved in 400 ml. of anhydrous liquid ammonia, producing ½ mol of hydrazine plus one mol of ammonium chloride in liquid ammonia. One mol (23 grams) of metallic sodium was dissolved in a sufficient amount of anhydrous ammonia to yield a blue solution and was slowly added with continuous stirring to the ammonia solution of hydrazine dihydrochloride. The container in which the solutions were mixed was kept cool with a Dry Ice-acetone mixture. Sodium chloride precipitated from the mixture and was separated by filtration under conditions which avoided the absorption of moisture. The sodium chloride residue was washed with several small portions of anhydrous liquid ammonia, and the washings were added to the filtrate. The combined filtrate and washings were distilled first at atmospheric pressure and −33° C. (the boiling point of ammonia) to remove the ammonia. The remaining liquid was distilled at 150 mm. (absolute) pressure and 75° C. to distill the hydrazine, leaving the remaining sodium chloride as residue. The recovery was 15.5 grams of pure anhydrous hydrazine, representing a yield of about 97%.

This run was duplicated under identical conditions and 15.4 grams of hydrazine of 100% purity was obtained.

While, because of its relatively low cost and plentiful supply, sodium will normally be used in this process, it is possible to obtain the desired results by using other alkali metals or alkaline earth metals among which, I specifically include potassium, lithium, rubidium, cesium, strontium, calcium, and barium. Since the purpose of adding the metal is to convert the ammonium ions to ammonia, it is necessary, in the interest of high yields, to use an amount of such metal equivalent to the ammonium or chloride ions present in the mixture. However, the use of excess metal should be carefully avoided since it may react with the hydrazine to produce explosive hydrazides.

The present method is not limited to mixtures containing a chloride ion, but is effective with mixtures containing other halogen ions, such as bromides, fluorides, iodides, and other ammonium salts which are inert toward hydrazine.

The present reaction proceeds satisfactorily at room temperatures and there is no necessity for heating the mixture.

The concentration of metal in the ammonia before addition to the hydrazine-containing mixture should be sufficiently low to give the highly mobile negative ions. The concentration is satisfactory if the solution has the characteristic blue color of dilute solutions. Large volumes of ammonia should normally be avoided since it must eventually be separated from the hydrazine.

I claim:

1. The method of separating hydrazine from combinations selected from the group consisting of the anhydrous hydrohalides of hydrazine and mixtures of hydrazine with halogen salts of ammonia comprising dissolving said combination in anhydrous liquid ammonia, adding thereto in liquid ammonia solution a quantity of a metal of the alkali and alkaline earth groups equivalent to the halogen in said combination, providing in the mixture thus formed a quantity of liquid ammonia sufficient to produce a dilute solution of said metal, thereby forming the metal salt of said halogen, and then fractionally distilling the reaction mixture to recover separately ammonia and hydrazine.

2. The method of separating hydrazine from the anhydrous hydrochlorides of hydrazine comprising dissolving said hydrochloride in anhydrous liquid ammonia, adding thereto in liquid ammonia solution a quantity of a metal of the group consisting of sodium, potassium, rubidium, cesium, lithium, calcium, strontium and barium, in an amount equivalent to the total chloride of said hydrochloride, providing in the mixture thus formed a quantity of liquid ammonia sufficient to produce a dilute solution of said metal, thereby forming the metal salt of said chloride, and then fractionally distilling the reaction mixture to recover separately ammonia and hydrazine.

3. The method of separating hydrazine from an anhydrous ammonia solution thereof containing dissolved ammonium salts comprising adding thereto in dilute liquid ammonia solution a metal of the group consisting of sodium, potassium, rubidium, cesium, lithium, calcium, strontium and barium, dissolved in sufficient ammonia to produce the blue color characteristic of dilute solutions, said metal being added in an amount equivalent to the anion of said salts, and then fractionally distilling the reaction mixture produced thereby to recover separately ammonia and hydrazine.

4. In the process for producing hydrazine by the oxidation of anhydrous ammonia with chlorine wherein the hydrazine product is obtained dissolved in liquid ammonia along with ammonium chloride, the method of recovering anhydrous hydrazine from said solution comprising adding thereto a stoichiometric quantity based on the total ammonium chloride of a metal of the group consisting of sodium, potassium, rubidium, cesium, lithium, calcium, strontium and barium, and then fractionally distilling the resulting reaction mixtures to recover separately anhydrous ammonia and anhydrous hydrazine.

5. In the process for producing hydrazine by the oxidation of anhydrous ammonia with chlorine wherein the hydrazine product is obtained dissolved in liquid ammonia along with ammonium chloride, the method of recovering anhydrous hydrazine from said solution comprising adding thereto anhydrous liquid ammonia having dissolved therein a quantity of a metal of the group consisting of sodium, potassium rubidium, cesium, lithium, calcium, strontium and barium, equivalent to the chloride ions present in the hydrazine containing solutions, the quantity of ammonia in which said metal is dissolved being sufficient to yield the blue color characteristic of dilute solutions, whereby the chloride of said added metal is formed, and fractionally distilling the resulting reaction mixture to recover separately ammonia and hydrazine.

6. The method of claim 5 wherein the metal is sodium.

7. The method of claim 5 wherein the metal is potassium.

8. The method of claim 5 wherein the metal is lithium.

9. The method of claim 5 wherein the metal is calcium.

10. The method of claim 5 wherein the metal is barium.

References Cited in the file of this patent

UNITED STATES PATENTS

| | | |
|---|---|---|
| 2,675,298 | Weiler et al. | Apr. 13, 1954 |
| 2,675,302 | Weiler | Apr. 13, 1954 |

OTHER REFERENCES

"The Chemistry of Hydrazine," by L. P. Audrieth and P. H. Mohr, Chem. and Eng. News, page 3746, vol. 26, No. 50; December 13, 1948.

"The Chemistry of Hydrazine," by L. F. Audrieth and B. A. Ogg, 1951 ed., page 51, John Wiley and Sons, Inc., N. Y.